United States Patent [19]
Wolf

[11] Patent Number: 6,061,825
[45] Date of Patent: May 9, 2000

[54] MONITORING OAM CELL ASSISTED METHOD TO DETECT BIT ERRORS OCCURRING IN ATM USEFUL CELLS ON AN ATM TRANSMISSION LINK

[75] Inventor: Andreas Wolf, Seehof, Germany

[73] Assignee: Tektronix, Inc., Beaverton, Oreg.

[21] Appl. No.: 09/077,271

[22] PCT Filed: Sep. 26, 1997

[86] PCT No.: PCT/DE97/02274

§ 371 Date: Jul. 6, 1999

§ 102(e) Date: Jul. 6, 1999

[87] PCT Pub. No.: WO98/14029

PCT Pub. Date: Apr. 2, 1998

[30] Foreign Application Priority Data

Sep. 27, 1996 [DE] Germany ......................... 196 41 398

[51] Int. Cl.[7] .............................. H03M 13/00; H04B 3/46
[52] U.S. Cl. ..................... 714/776; 370/248; 714/704; 714/712
[58] Field of Search .................. 714/704, 712, 714/776; 370/248

[56] References Cited

U.S. PATENT DOCUMENTS

| | | | |
|---|---|---|---|
| 5,440,565 | 8/1995 | Miyamoto et al. | 371/20.4 |
| 5,541,926 | 7/1996 | Saito et al. | 370/94.2 |
| 5,570,357 | 10/1996 | Van Tetering et al. | 371/20.1 |
| 5,579,303 | 11/1996 | Kiriyama | 370/17 |
| 5,633,868 | 5/1997 | Baldwin et al. | 370/331 |
| 5,661,722 | 8/1997 | Miyagi | 370/235 |
| 5,675,587 | 10/1997 | Okuyama et al. | 371/20.1 |
| 5,717,689 | 2/1998 | Ayanoglu | 370/349 |
| 5,875,177 | 2/1999 | Uriu et al. | 370/244 |
| 5,878,063 | 3/1999 | Kawasaki et al. | 371/65 |
| 5,886,989 | 3/1999 | Evans et al. | 370/347 |
| 5,887,000 | 3/1999 | Adachi et al. | 371/20.1 |

FOREIGN PATENT DOCUMENTS 0 708 572 A2 4/1996 European Pat. Off. .

OTHER PUBLICATIONS

PCT International Search Report, PCT/DE/02274, Mar. 1998.

Nishimura et al., "Asynchronous Transfer Mode Network for Broadband ISDN", Hitachi Review, vol. 43, No. 2, pp. 47–52, Apr. 1994.

Wolf, "Leistungmessungen in ATM–Netzen", NTZ Nachrichtentechnische Zeitschrift, vol. 47, No. 6, Jun. 1, 1994, pp. 408–413.

Ohta et al., "A Cell Loss Recovery Method using FEC in ATM Networks", IEEE Journal on Selected Areas in Communications, vol. 9, No. 9, Dec. 1, 1991, pp. 1471–1483.

Wolf, "Auswahl einer Optimalen Codierung fuer Testzelln in ATM–Netzen", NTZ Nachrichtentechnische Zeitschrift, vol. 47, No. 7, Jul. 1994, pp. 484–487.

*Primary Examiner*—Stephen M. Baker
*Attorney, Agent, or Firm*—Franz-Josef Fuchs; Thomas F. Lenihan

[57] ABSTRACT

A monitoring OAM cell assisted method enables continuous intrasystem determination of bit errors which have occurred in ATM useful cells with a useful information field and a cell head on an ATM transmission link. First control bits are generated by evaluating bits of ATM useful cells with selected target addresses in the cell head prior to feeding the ATM useful cells into the transmission link, and the control bits are additionally encoded to generate second control bits. The first and second control bits and OAM cells are then transmitted along with the ATM useful bits. The second control bits of the monitoring OAM cells are received at the far end of the ATM transmission link and examined for errors to determine if the monitoring OAM cells were received without error. The first control bits are used to determine if the useful ATM cells were received error-free.

3 Claims, 1 Drawing Sheet

MONITORING OAM CELL ASSISTED METHOD TO DETECT BIT ERRORS OCCURRING IN ATM USEFUL CELLS ON AN ATM TRANSMISSION LINK

BACKGROUND OF THE INVENTION

The invention relates to a monitoring OAM cell assisted method enabling continuous intrasystem determination of bit errors which have occurred in ATM useful cells with a useful information field and a cell head on an ATM transmission link. This method comprises the generation of control bits by evaluating bits of ATM useful cells with a selected target address in the cell head prior to feeding the ATM useful cells into the ATM transmission link, whereupon said control bits are additionally encoded thus generating further control bits. As a next step, in addition to the ATM useful cells, the monitoring OAM cells are transmitted on the ATM transmission link together with the one control bits and the further control bits. The further control bits of the monitoring OAM cells received at the other end of the ATM transmission link are then examined as to whether the respective monitoring OAM cells were transmitted without error and the bit errors which have occurred in the related received ATM useful cells are determined by means of the one control bits of the monitoring OAM cells recognized as having been transmitted error-free.

In a known method of this kind (Andreas Wolf, 'Leistungsmessungen in ATM-Netzen', NTZ volume 47, issue 6, 1994, pages 408 to 413) monitoring OAM cells are used for continuous intrasystem monitoring of an ATM transmission link. For this purpose, the monitoring OAM cells are introduced into the cell stream of the ATM useful cells. EDC data (EDC: error detecting code) contained in the useful data of said monitoring OAM cells allows the detection of bit errors in ATM useful cells. In practice, only ATM useful cells with a selected target address in the cell head are used. According to the above-quoted prior art, the useful data of the monitoring OAM cells furthermore include ECB data (ECB: error check bits) allowing the detection of bit errors in the monitoring OAM cell in question. To be more precise, this is the cyclic supplementation of an Abramson code which makes it possible to detect up to three bit errors. If, during a verification of the ECB data, errors are detected in one of the monitoring OAM cells, such cell is eliminated and not used for evaluation.

OBJECTS OF THE INVENTION

It is the object of the present invention to provide a method for detecting bit errors which have occurred in ATM useful cells on an ATM transmission link, which method allows the detection of almost all bit errors in ATM useful cells with the selected target address in the cell head.

This object is accomplished according to the invention in that the monitoring OAM cells which were recognized as having been transmitted defectively are corrected by means of their further control bits and thus converted into error-free monitoring OAM cells. The one control bits of these monitoring OAM cells are then used for detecting the bit errors which have occurred in the received ATM useful cells with the selected target address in the cell head.

The essential advantage of this method is that—after the correction of the monitoring OAM cells which were recognized as having been transmitted defectively—a larger total of monitoring OAM cells is available for evaluation, making it possible to more reliably determine bit errors in the ATM useful cells with the selected target address in the cell head than by means of the known method.

To ensure that the monitoring OAM cells fed into the cell stream are of a predetermined constant cell length, it is considered advantageous to use a block code for additional encoding.

A very efficient type of encoding is BCH encoding (BCH: Bose Chaudhuri Hocquenghem) or CCF encoding (CCF: cross-correlation function) and it is thus considered advantageous to use a CCF code or a BCH code as the block code. The essential advantage of using a BCH code or a CCF code is that these codes allow the detection and correction of up to 30 bit errors in each monitoring OAM cell—which is clearly more than is possible with the known method which—as already set out above—detects up to three bit errors.

BRIEF DESCRIPTION OF THE DRAWING

As an illustration of the invention, the (only) FIGURE is a block diagram view of an embodiment of an arrangement for performing the method according to the invention.

DESCRIPTION OF THE PREFERRED EMBODIMENTS

Figure 1:
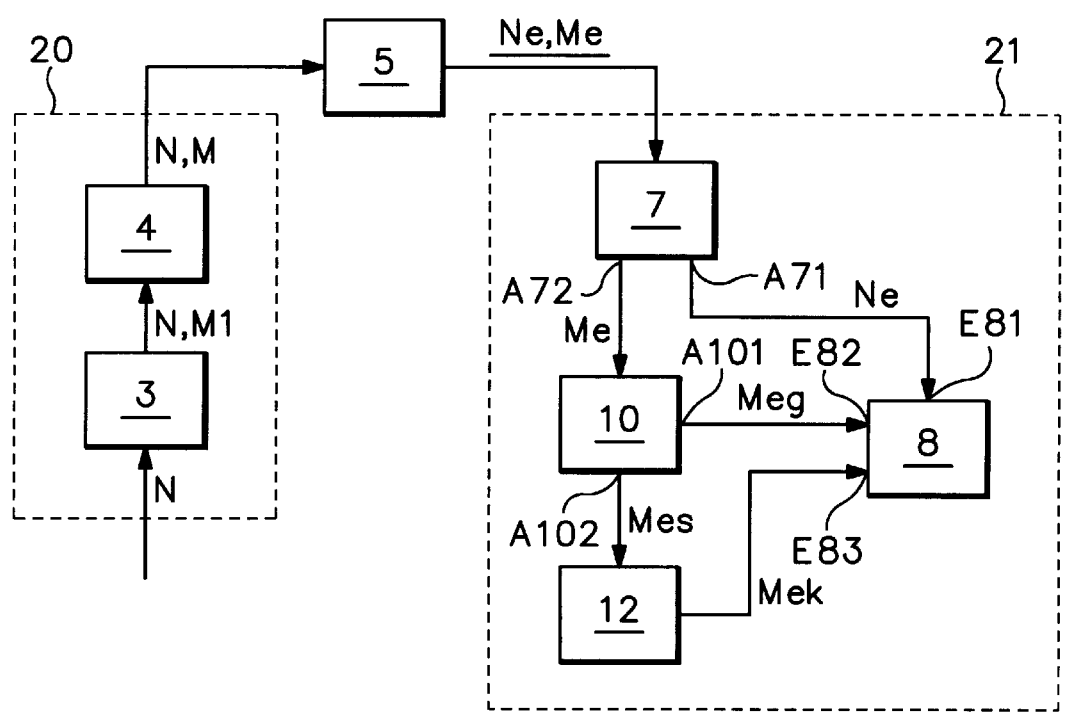

Via its output, an encoding means 3 is connected to an additional encoding means 4. The additional encoding means 4 has its output connected to an ATM transmission link 5 which is followed by a receiving unit 7. Connected after one output A71 of the receiving unit 7 is one input E81 of a useful cell correction unit 8. One further output A72 of the receiving unit 7 is connected to an error detection device 10. One output A101 of the error detection device 10 is connected to a further input E82 of the useful cell correction unit 8. Connected after a further output A102 of the error detection device 10 is an OAM correction device 12. Connected after the latter is an additional input E83 of the useful cell correction unit 8. The encoding means 3 and the additional encoding means 4 constitute an encoding circuit 20; the receiving unit 7, the error detection device 10, the useful cell correction device 8 and the OAM correction device 12 constitute a decoding circuit 21.

ATM useful cells N with a useful information field and a cell head are passed from a message source (not shown) to the encoding means 3, the input of which at the same time constitutes the input of the encoding circuit 20. Said encoding means 3 generates control bits for monitoring OAM cells M1 through an evaluation of bits of ATM useful cells with a selected target address in the cell head, e.g. according to the above cited prior art. Besides EDC data (EDC: error detecting code) for detecting bit errors in the ATM useful cells with the selected target address in the cell head, such control bits may also include TUC data (TUC: total cell number) indicating the number of ATM useful cells fed into said ATM transmission link 5, as well as MSN data (MSN: monitoring OAM cell sequence number) indicating the continuous numbering of the monitoring OAM cells. Said control bits are entered into the monitoring OAM cells M1 generated in the encoding means 3.

From said encoding means 3, the ATM useful cells N and the monitoring OAM cells M1 are transmitted to the additional encoding means 4. Said additional encoding means 4 generates further control bits from the one control bits of each monitoring OAM cell M1 by means of an additional encoding step, said further control bits being additionally entered in the respective monitoring OAM cells M1. In this manner, monitoring OAM cells M having the one and the further control bits are generated.

Since the monitoring OAM cells are of a constant cell length, the additional encoding performed in the additional encoding means 4 should be based on a block code which has been made such that the further control bits will fit into the part of the useful information field that is free of the one control bits.

The block code may for instance be based on a BCH code or a CCF code which either allow for very efficient encoding, decoding and error correction (cf. Andreas Wolf, 'Meβtechnik für das BISDN', published by VDE-Verlag GmbH, 1992).

The additional encoding means 4 feeds the useful cells N and the monitoring OAM cells M having the one and the further control bits into the ATM transmission link 5. From the output of the ATM transmission link 5, transmitted ATM useful cells Ne and transmitted monitoring OAM cells Me are passed on to the receiving unit 7 and thus to the decoding circuit 21. Said receiving unit 7 separates the transmitted monitoring OAM cells Me from the transmitted ATM useful cells Ne by reading their cell heads. The transmitted ATM useful cells Ne are passed on to the useful cell correction device 8. The transmitted monitoring OAM cells Me are transmitted to the error detection device 10 which will check on the basis of the further control bits whether the one control bits were transmitted without errors. Monitoring OAM cells Meg which were recognized as having been transmitted error-free are passed on to the useful cell correction device 8. Transmitted monitoring OAM cells Mes found to contain errors are passed on to the OAM correction device 12. This device performs an error correction of the monitoring OAM cells Mes which were recognized as having been transmitted defectively by means of the further control bits. Methods for performing error detection and error correction operations are for example described in: M. Y. Rhee, 'Error Correcting Coding Theory', McGraw-Hill Publishing Company, 1989; J. Swoboda, 'Codierung zur Fehlerkorrektur und Fehlererkennung', R, Oldenbourg Verlag, München, 1973.

After the error correction, the OAM correction device 12 converts the monitoring OAM cells Mes recognized as having been transmitted defectively into error-free monitoring OAM cells Mek. The latter are passed on to the useful cell correction device 8. The monitoring OAM cells Mes recognized as having been transmitted defectively that were impossible to correct due to an exceedingly high number of bit errors will not be processed further; they are not passed on to the useful cell correction unit 8.

Consequently, the useful cell correction unit 8 holds the transmitted ATM useful cells Ne, the monitoring OAM cells Meg recognized as having been transmitted free of errors and the monitoring OAM cells Mek from which any errors have been eliminated. The one control bits of these monitoring OAM cells Meg and Mek are used for determining bit errors in the ATM useful cells with the selected target address in the cell head.

A data processing system may be used for performing the method according to the invention.

I claim:

1. A monitoring OAM cell (M) assisted method for the continuous intrasystem determination of bit errors which have occurred in ATM useful cells (N) having a useful information field and a cell head on an ATM transmission link (5), wherein before the ATM useful cells (N) are fed into the ATM transmission link (5), control bits are generated through evaluation of bits of ATM useful cells with a selected target address in the cell head, said control bits are additionally encoded, in which process further control bits are generated, in addition to the ATM useful cells (N), the monitoring OAM cells (M) with the one control bits and the further control bits are transmitted on the ATM transmission link (5), the further control bits of the monitoring OAM cells (Me) received at the other end of the ATM transmission link (5) are examined as to whether the respective monitoring OAM cells were transmitted error-free, and the one control bits of the monitoring OAM cells (Meg) which were recognized as having been transmitted error-free are used for determining the bit errors having occurred in the associated received ATM useful cells, characterized in that monitoring OAM cells (Mes) which were recognized as having been transmitted defectively are corrected by means of their further control bits and converted into monitoring OAM cells (Mek) from which any errors have been eliminated, and the one control bits of these monitoring OAM cells (Mek) are used for detecting bit errors which have occurred in the received ATM useful cells with the selected target address in the cell head.

2. The method of claim 1 characterized in that a block code is used for additional encoding.

3. The method of claim 2 characterized in that the block code is a BCH code or a CCF code.

* * * * *